(12) United States Patent
Li et al.

(10) Patent No.: US 10,878,114 B2
(45) Date of Patent: *Dec. 29, 2020

(54) SOFTWARE HANDLING DEVICE, SERVER SYSTEM AND METHODS THEREOF

(71) Applicant: Huawei Technologies Co., Ltd., Shenzhen (CN)

(72) Inventors: Yong Li, Shenzhen (CN); Guowei Xu, Wuhan (CN); Bin Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/726,593

(22) Filed: Dec. 24, 2019

(65) Prior Publication Data
US 2020/0210602 A1 Jul. 2, 2020

Related U.S. Application Data

(63) Continuation of application No. 15/605,641, filed on May 25, 2017, now Pat. No. 10,534,924, which is a (Continued)

(30) Foreign Application Priority Data

Jan. 12, 2015 (EP) .................................... 15150732

(51) Int. Cl.
*G06F 21/62* (2013.01)
*G06F 21/10* (2013.01)
(Continued)

(52) U.S. Cl.
CPC .......... *G06F 21/6209* (2013.01); *G06F 21/10* (2013.01); *G06F 21/31* (2013.01);
(Continued)

(58) Field of Classification Search
CPC .......... G06F 21/62; G06F 21/31; G06F 21/60; G06F 21/10; G06F 21/08; G06F 21/105;
(Continued)

(56) References Cited

U.S. PATENT DOCUMENTS

| 6,920,567 B1 * | 7/2005 | Doherty .................. G06F 21/10 707/999.104 |
| 2002/0107809 A1 * | 8/2002 | Biddle .................. G06F 21/105 705/59 |

(Continued)

FOREIGN PATENT DOCUMENTS

| CN | 101091156 A | 12/2007 |
| CN | 102265282 A | 11/2011 |

OTHER PUBLICATIONS

U.S. Appl. No. 15/605,641, filed May 25, 2017, Patented.

*Primary Examiner* — Jayesh M Jhaveri
(74) *Attorney, Agent, or Firm* — Leydig, Voit & Mayer, Ltd.

(57) ABSTRACT

The present disclosure relates to a software handling device and a server system. The software handling device comprises a processor and a transceiver, wherein the transceiver is configured to transmit various requests and to receive various verifications and encryption keys to and from a server system. The server system comprises an authentication server, a licensing server and a software application server, wherein the server system is configured to receive various requests and to transmit various verifications and encryption keys from and to a software handling device. Furthermore, the present disclosure also relates to corresponding methods, a computer program, and a computer program product.

15 Claims, 12 Drawing Sheets

Related U.S. Application Data continuation of application No. PCT/EP2016/050204, filed on Jan. 7, 2016.

(51) Int. Cl.
    *G06F 21/31*     (2013.01)
    *G06F 21/60*     (2013.01)
    *H04L 9/08*     (2006.01)
    *H04L 29/06*     (2006.01)

(52) U.S. Cl.
    CPC .......... *G06F 21/606* (2013.01); *H04L 9/0861* (2013.01); *H04L 63/168* (2013.01); *G06F 2221/032* (2013.01); *G06F 2221/033* (2013.01); *G06F 2221/0755* (2013.01)

(58) Field of Classification Search
    CPC .............. G06F 21/6209; G06F 21/606; G06F 2221/031; G06F 2221/032; H04L 9/08; H04L 29/06; H04L 9/0861; H04L 63/168
See application file for complete search history.

(56) References Cited

U.S. PATENT DOCUMENTS

| | | | |
|---|---|---|---|
| 2004/0039916 A1* | 2/2004 | Aldis | G06F 21/105 713/177 |
| 2006/0095957 A1 | 5/2006 | Lundblade et al. | |
| 2008/0320533 A1* | 12/2008 | Kitazato | G06F 21/10 725/98 |
| 2009/0006261 A1* | 1/2009 | Bernstein | G06F 21/10 705/59 |
| 2011/0265186 A1 | 10/2011 | Kwon et al. | |
| 2014/0173759 A1 | 6/2014 | Essary et al. | |
| 2014/0195824 A1 | 7/2014 | Lu et al. | |
| 2014/0282895 A1 | 9/2014 | Stuntebeck | |
| 2014/0289515 A1 | 9/2014 | Sorotokin et al. | |
| 2015/0082038 A1* | 3/2015 | Sato | H04L 63/0869 713/169 |
| 2015/0134534 A1* | 5/2015 | Lai | G06Q 50/184 705/59 |

\* cited by examiner

SOFTWARE HANDLING DEVICE, SERVER SYSTEM AND METHODS THEREOF

CROSS-REFERENCE TO RELATED APPLICATIONS

This application is a continuation of U.S. application Ser. No. 15/605,641, filed on May 25, 2017, which is a continuation of International Application No. PCT/EP2016/050204, filed on Jan. 7, 2016, which claims priority to European Patent Application No. 15150732.4, filed on Jan. 12, 2015. All of the aforementioned patent applications are hereby incorporated by reference in their entireties.

TECHNICAL FIELD

The present disclosure relates to a software handling device and to a corresponding server system. Furthermore, the present disclosure also relates to corresponding methods, a computer program, and a computer program product.

BACKGROUND

HyperText Markup Language (HTML), including JavaScript and Cascading Style Sheets (CSS), has been one of most popular programming languages used not only to develop web sites but also to develop applications (so called Apps) for smart phones, tablets and other similar communication devices. While HTML as a language has many advantages, HTML also has some major weaknesses which prevent many software vendors from writing massive proprietary code in HTML.

Use of HTML Apps in mobile device computing (i.e. computing on mobile devices including e.g. smart phones and tablets) has been rapidly increasing in mobile web sites and packaged Apps and has become very popular. A HTML App is a software application that is constructed by HTML/JavaScript/CSS code and runs upon a Web Engine. A Web Runtime is software that manages and launches the HTML App.

However, it is very easy to get or extract the source code of a HTML App including HTML, JavaScript and CSS source code. It is easy to view, modify and debug a web site's source code with a web browser's built-in debug tool, and it is also possible to download publicly available tools for extracting the source code of a HTML App from its Android application package, i.e. a ".apk" file.

This is an obstacle for software vendors to implement their private valuable algorithms in HTML Apps, because proprietary software vendors need a solution to protect their source code from being reverse-engineered and/or protect their HTML Apps from being illegally copied.

One solution is to use code obfuscation tools to obfuscate the source code of HTML Apps before packaging the HTML Apps. Code obfuscation can significantly increase the difficulty of JavaScript code reverse-engineering and tampering. However, code obfuscation does not protect HTML programs from being copied since obfuscation does not affect the ability or difficulty of copying the source code and reusing the source code on a different computing device. Hence, it is easy for experienced hackers to reverse-engineer and re-engineer obfuscated source code. Furthermore, program developers must do the obfuscation when releasing the program and therefore debugging a release version of the software becomes very difficult because of the code obfuscation.

SUMMARY

An objective of embodiments of the present disclosure is to provide a solution which mitigates or solves the drawbacks and problems of conventional solutions.

An "or" in this description and the corresponding claims is to be understood as a mathematical OR which covers "and" and "or", and is not to be understand as an XOR (exclusive OR).

The above objectives are solved by the subject matter of the independent claims. Further advantageous implementation forms of the present disclosure can be found in the dependent claims.

According to a first aspect of the disclosure, the above mentioned and other objectives are achieved with a software handling device comprising a processor and a transceiver, wherein the transceiver is configured to:

transmit an authentication request signal to an authentication server, the authentication request signal comprising a user authentication request, receive an authentication verification signal from the authentication server, the authentication verification signal comprising a user authentication verification in response to the user authentication request, transmit a license request signal to a license server, the license request signal comprising the user authentication verification, receive a license verification signal from the license server, the license verification signal comprising a license verification associated with the user authentication verification, transmit a download request signal to a software application server, the download request signal comprising the license verification, and download an encrypted source code of a software application from the software application server, the software application being associated with the license verification, and wherein the processor is configured to store the encrypted source code of the software application in a memory.

According to a second aspect of the disclosure, the above mentioned and other objectives are achieved with a software handling device comprising a processor and a transceiver, wherein the transceiver is configured to:

transmit an authentication request signal to an authentication server, the authentication request signal comprising a user authentication request, receive an authentication verification signal from the authentication server, the authentication verification signal comprising a user authentication verification in response to the user authentication request, transmit a license request signal to a license server, the license request signal comprising the user authentication verification, and receive a license encryption signal from the license server, the license encryption signal comprising a license encryption key associated with the user authentication verification, and wherein the processor is configured to load an encrypted source code of a software application stored in a memory, decrypt the encrypted source code of the software application based on the license encryption key, and run the software application by executing the decrypted source code.

In a possible implementation form of the software handling device according to the second aspect, the processor is configured to use a web engine for executing the decrypted source code.

This implementation form therefore implies that the source code executed by the processor is a HTML application.

According to a third aspect of the disclosure, the above mentioned and other objectives are achieved with a communication device for a communication system. The communication device comprises a software handling device according to embodiments of the present disclosure. The communication device has computing capabilities and may e.g. be a computer, smart phone, tablet computer, etc.

According to a fourth aspect of the disclosure, the above mentioned and other objectives are achieved with a server system for a communication system, the server system comprising an authentication server, a licensing server and a software application server, wherein the authentication server comprises a transceiver configured to receive an authentication request signal from a software handling device, the authentication request signal comprising a user authentication request, and transmit an authentication verification signal to the software handling device if the user authentication request is valid, the authentication verification signal comprising a user authentication verification, wherein the licensing server comprises a transceiver configured to receive a license request signal from the software handling device, the license request signal comprising the user authentication verification, and transmit a license verification signal to the software handling device if the user authentication verification is valid, the license verification signal comprising a license verification, wherein the software application server comprises a transceiver configured to receive a download request signal from the software handling device, the download request signal comprising the license verification, and transmit an encrypted source code of a software application to the software device if the license verification is valid, the software application being associated with the license verification.

It shall be mentioned, that the server system can be a centralized system comprising the authentication server, the licensing server and the software application server for example in one single computer or a decentralized system where components of the server system are distributed over several computers.

According to a fifth aspect of the disclosure, the above mentioned and other objectives are achieved with a server system for a communication system, the server system comprising an authentication server and a licensing server, wherein the authentication server comprises a transceiver configured to receive an authentication request signal from a software handling device, the authentication request signal comprising a user authentication request, and transmit an authentication verification signal to the software handling device if the user authentication request is valid, the authentication verification signal comprising a user authentication verification, wherein the licensing server comprises a transceiver configured to receive a license request signal from the software handling device, the license request signal comprising the user authentication verification, and transmit a license encryption signal to the software handling device if the user authentication verification is valid, the license encryption signal comprising a license encryption key for an encrypted source code of a software application.

It shall be mentioned, that the server system can be a centralized system comprising the authentication server and the licensing server for example in one single computer or a decentralized system where components of the server system are distributed over several computers.

In a possible implementation form of the server system according to the fifth aspect, the license encryption key is unique for the software application and the associated software handling device.

This implementation form implies that since the license encryption key is unique for the software application the license encryption key cannot be used for other software applications. Further, since the license encryption key is unique for the associated software handling device the license encryption key is only valid for that specific associated software handling device and cannot be used by other software handling devices.

Embodiments of the present disclosure with the present software handling device and the server system and the interaction between the software handling device and the server system for installing and running software provide a generic solution for application copy protection and anti-tampering. This is achieved by the request and verification signalling between the present software handling device and server system for installing and running software.

Further, conventional protection such as code obfuscation is not needed, therefore making the present solution convenient for application vendors to protect their intellectual properties.

Moreover, the software source code is protected from being copied and this without any need of adding further HTML, JavaScript or CSS code into the application's source code which means time saving and reduced cost in program development.

In a first possible implementation form of the software handling device according to the first or second aspects or the server system according to the fourth or fifth aspects, the license request signal further comprises an indication of an identity of the software application.

With this implementation form the identity of the software application will be known to the server system so that the software application can be verified.

In a second possible implementation form of the software handling device or the server system according to the first implementation form of the first or second aspects or the fourth or fifth aspects, the user authentication verification is a first token or the license verification is a second token.

An advantage with this implementation form is that by using tokens high security requirements can be meet. Further, using tokens means convenient implementation of the present solution.

In a third possible implementation form of the software handling device or the server system according to the first or second implementation forms of the first or second aspects or the fourth or fifth aspects or the software handling devices or the server systems as such, the license request signal further comprises an indication of an identity of a communication device comprising the software handling device.

An advantage with this implementation form is that licensing can be limited to valid communication device(s) only.

In a fourth possible implementation form of the software handling device or the server system according to the first or second or third implementation forms of the first or second aspects or the fourth or fifth aspects, or the software handling devices or the server systems as such, the software application is a HyperText Markup Language (HTML) software application.

An advantage with this implementation form is that HTML applications are protected from tampering and/or copying.

According to a sixth aspect of the disclosure, the above mentioned and other objectives are achieved with a method comprising the steps of:

transmitting an authentication request signal to an authentication server, the authentication request signal comprising a user authentication request, receiving an authentication verification signal from the authentication server, the authentication verification signal comprising a user authentication verification in response to the user authentication request, transmitting a license request signal to a license server, the license request signal comprising the user authentication verification, receiving a license verification signal from the license server, the license verification signal comprising a license verification associated with the user authentication verification, transmitting a download request signal to a software application server, the download request signal comprising the license verification, downloading an encrypted source code of a software application from the software application server, the software application being associated with the license verification, and storing the encrypted source code of the software application in a memory, such as a persistent memory.

According to a seventh aspect of the disclosure, the above mentioned and other objectives are achieved with a method comprising the steps of:

transmitting an authentication request signal to an authentication server, the authentication request signal comprising a user authentication request, receiving an authentication verification signal from the authentication server, the authentication verification signal comprising a user authentication verification in response to the user authentication request, transmitting a license request signal to a license server, the license request signal comprising the user authentication verification, receiving a license encryption signal from the license server, the license encryption signal comprising a license encryption key associated with the user authentication verification, loading an encrypted source code of a software application stored in a memory, decrypting the encrypted source code of the software application based on the license encryption key, and running the software application by executing the decrypted source code.

In a possible implementation form of the method according to the seventh aspect, the method further comprises using a web engine for executing the decrypted source code.

According to an eighth aspect of the disclosure, the above mentioned and other objectives are achieved with a method comprising the steps of:

receiving an authentication request signal from a software handling device, the authentication request signal comprising a user authentication request, transmitting an authentication verification signal to the software handling device if the user authentication request is valid, the authentication verification signal comprising a user authentication verification, receiving a license request signal from the software handling device, the license request signal comprising the user authentication verification, and transmitting a license verification signal to the software handling device if the user authentication verification is valid, the license verification signal comprising a license verification, receiving a download request signal from the software handling device, the download request signal comprising the license verification, and transmitting an encrypted source code of a software application to the software device if the license verification is valid, the software application being associated with the license verification.

According to a ninth aspect of the disclosure, the above mentioned and other objectives are achieved with a method comprising the steps of:

receiving an authentication request signal from a software handling device, the authentication request signal comprising a user authentication request, transmitting an authentication verification signal to the software handling device if the user authentication request is valid, the authentication verification signal comprising a user authentication verification, receiving a license request signal from the software handling device, the license request signal comprising the user authentication verification, and transmitting a license encryption signal to the software handling device if the user authentication verification is valid, the license encryption signal comprising a license encryption key for an encrypted source code of a software application.

In a possible implementation form of the server system according to the ninth aspect, the license encryption key is unique for the software application and the associated software handling device.

In a first possible implementation form of the method according to the sixth, seventh, eighth or ninth aspects, the license request signal further comprises an indication of an identity of the software application.

In a second possible implementation form of the method according to the first implementation form of the sixth, seventh, eighth or ninth aspects, or the methods as such, the user authentication verification is a first token or the license verification is a second token.

In a third possible implementation form of the method according to the second implementation form of the sixth, seventh, eighth or ninth aspects, the license request signal further comprises an indication of an identity of a communication device comprising the software handling device.

In a fourth possible implementation form of the method according to the first implementation form of the sixth, seventh, eighth or ninth aspects, or the methods as such, the software application is a HyperText Markup Language (HTML) software application.

The advantages of the methods according to the sixth, seventh, eighth and ninth aspects are the same as those for the corresponding device aspects.

The present disclosure also relates to a computer program, characterized in code means, which when run by processing means, causes said processing means to execute any method according to the present disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the present disclosure will be apparent from the following detailed description.

BRIEF DESCRIPTION OF THE DRAWINGS

The appended drawings are intended to clarify and explain different embodiments of the present disclosure, in which.

DETAILED DESCRIPTION

Figure 1:
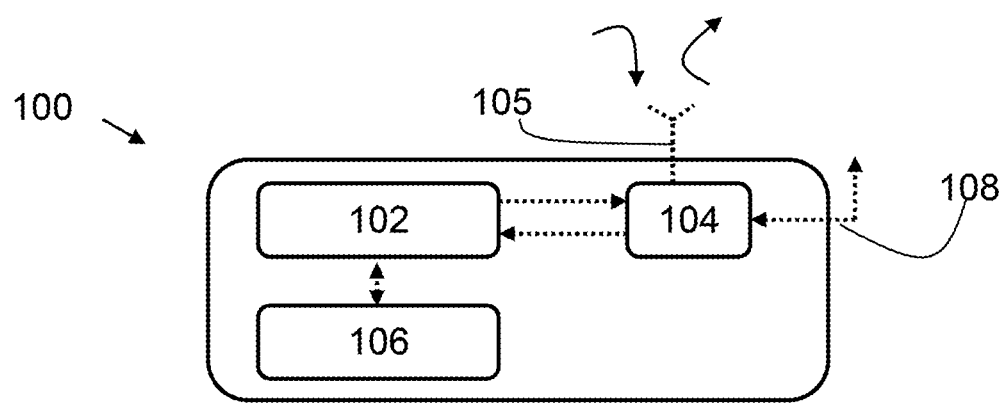
FIG. 1 shows a software device according to embodiments of the present disclosure.

FIG. 1 shows a software handling device 100 according to different aspects and embodiments of the present disclosure. The software device 100 in FIG. 1 comprises a processor 102 and a transceiver 104 which are communicably coupled to each other. This is illustrated with the two dashed arrows between the processor 102 and the transceiver 104. The software handling device 100 further comprises in this example an antenna 105 for wireless communications and/or a wired connection for wired communications.

When the software handling device 100 installs (or downloads) a software application, the software handling device 100 is configured as follows. The transceiver 104 is configured to transmit an authentication request signal to an authentication server. The authentication request signal comprises a user authentication request. The transceiver 104 is further configured to receive an authentication verification signal from the authentication server. The authentication verification signal comprises a user authentication verification in response to the user authentication request. The transceiver 104 is further configured to transmit a license request signal to a license server. The license request signal comprises the user authentication verification. The transceiver 104 is further configured to receive a license verification signal from the license server. The license verification signal comprises a license verification associated with the user authentication verification. The transceiver 104 is further configured to transmit a download request signal to a software application server. The download request signal comprises the license verification. The transceiver 104 is further configured to download an encrypted source code of a software application from the software application server. The software application is associated with the license verification. Finally, the processor 102 is configured to store the encrypted source code of the software application in a memory 106, e.g. a persistent memory of the software handling device 100.

The software handling device 100 is according to an embodiment a standalone device configured to install and run applications. However, the software handling device 100 may according to another embodiment be integrated in another device, e.g. a communication device with computing capabilities. In this case the processor 102 and the transceiver 104 of the software handling device 100 may be the processor and the transceiver of the communication device.

Further, the memory 106 may be comprised in the software handling device 100 as shown in the example in FIG. 1. According to another embodiment the memory 106 may be part of another device and therefore not part of the software handling device 100. The memory 106 can e.g. be part of the above mentioned communication device.

When the software handling device 100 runs or executes the software application the configurations to receive the user authentication verification above are the same. Thereafter, after receiving the user authentication verification the transceiver 104 is further configured to transmit a license request signal to a license server. The license request signal comprises the user authentication verification. The transceiver 104 is further configured receive a license encryption signal from the license server. The license encryption signal comprises a license encryption key associated with the user authentication verification. The processor 102 is further configured to load the encrypted source code in the memory 106. The processor 102 is further configured to decrypt the encrypted source code based on the license encryption key. The processor 102 is finally configured to run the software application by executing the decrypted source code.

Figure 2:
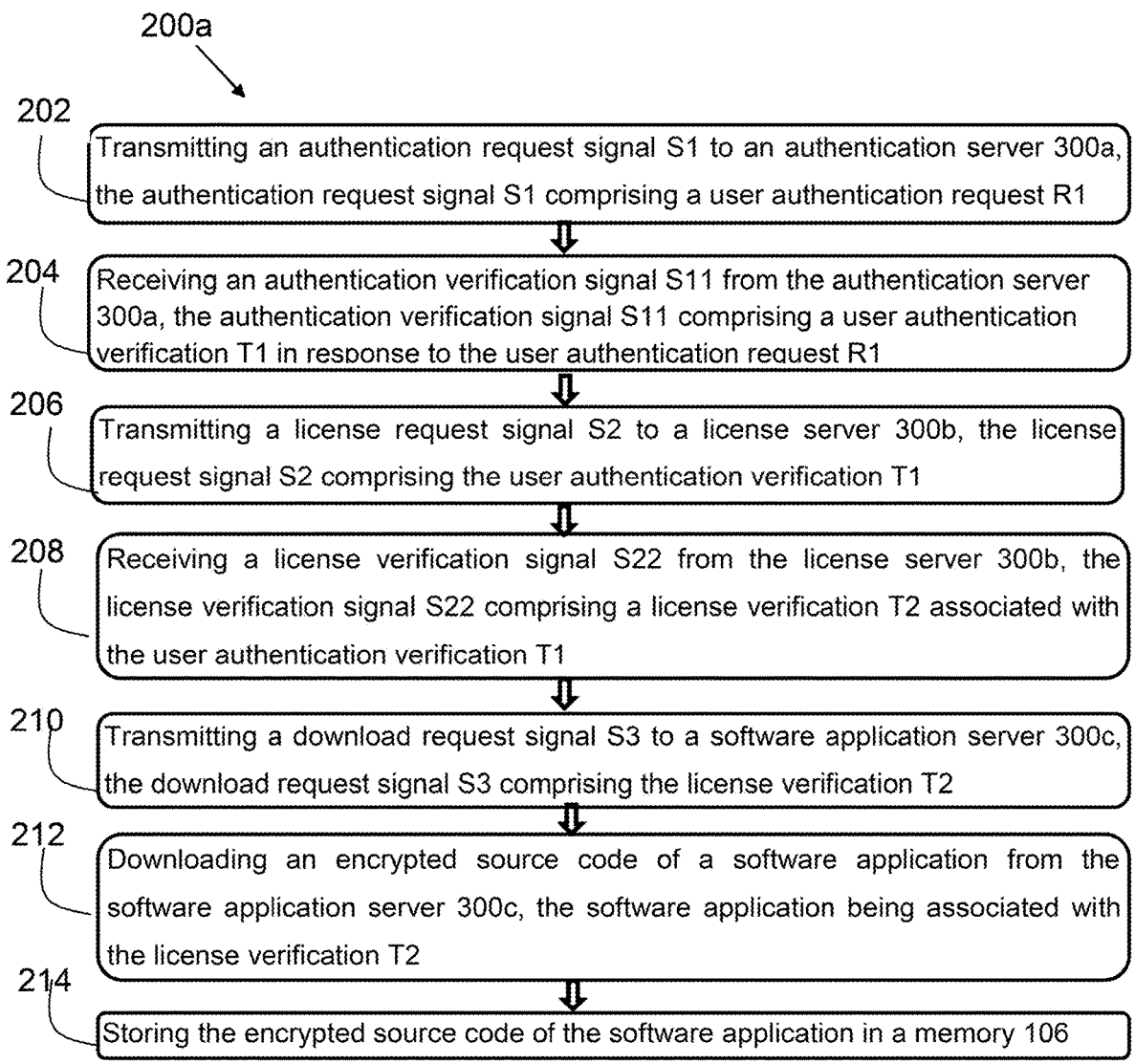
FIG. 2 shows a method according to an embodiment of the present disclosure.

FIG. 2 shows a corresponding method 200a which in this example is executed in a software device 100 shown in FIG. 1. The method 200a in FIG. 2 relates to the aspect of installing or downloading the software application. The method comprises the step 202 of transmitting an authentication request signal S1 to an authentication server 300a. The authentication request signal S1 comprising a user authentication request R1 (which may include a pair of user name and password). The method 200a further comprises the step 204 of receiving an authentication verification signal S11 from the authentication server 300a. The authentication verification signal S11 comprising a user authentication verification T1 in response to the user authentication request R1. The method 200a further comprises the step 206 of transmitting a license request signal S2 to a license server 300b. The license request signal S2 comprising the user authentication verification T1. The method 200a further comprises the step 208 of receiving a license verification signal S22 from the license server 300b. The license verification signal S22 comprising a license verification T2 associated with the user authentication verification T1. The method 200a further comprises the step 210 of transmitting a download request signal S3 to a software application server 300c. The download request signal S3 comprising the license verification T2. The method 200a further comprises the step 212 of downloading an encrypted source code of a software application from the software application server 300c. The software application is associated with the license verification T2. The method 200a further comprises the step 214 of storing the encrypted source code of the software application in a memory 106. The user authentication verification T1 and the license verification T2 may be numbers that the server system 300 will trust during a certain time period which means that T1 and T2 are valid during the time period.

Figure 3:
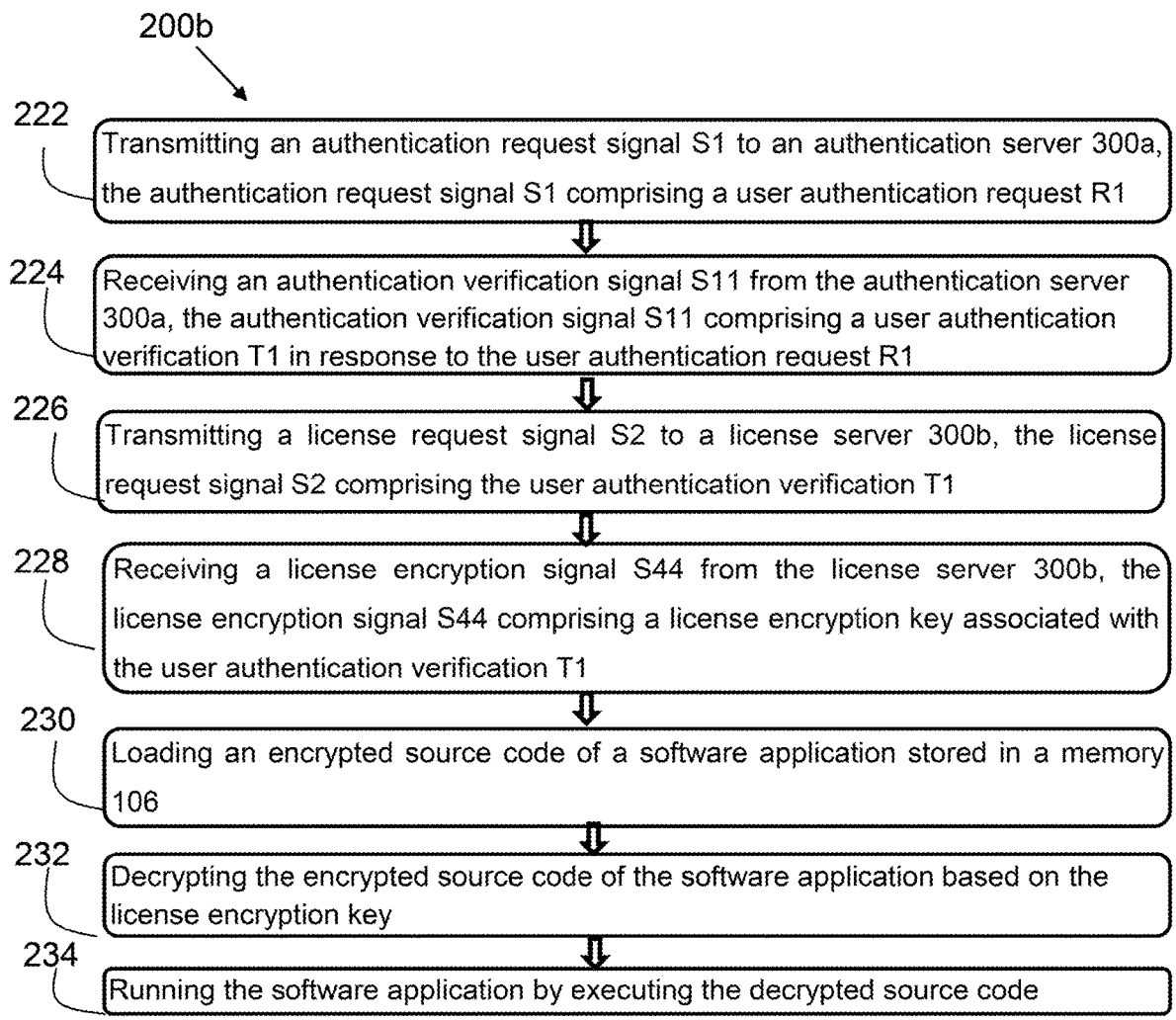
FIG. 3 shows a further method according to an embodiment of the present disclosure.

FIG. 3 shows another corresponding method 200b which in this example is executed in a software device 100 shown in FIG. 1. The method 200b in FIG. 3 relates to the aspect of running or executing the software application. The method 200b comprises the step 222 of transmitting an authentication request signal S1 to an authentication server 300a. The authentication request signal S1 comprising a user authentication request R1. The method 200b further comprises the step 224 of receiving an authentication verification signal S11 from the authentication server 300a. The authentication verification signal S11 comprising a user authentication verification T1 in response to the user authentication request R1. The method 200b further comprises the step 226 of transmitting a license request signal S2 to a license server 300b. The license request signal S2 comprising the user authentication verification T1. The method 200b further comprises the step 228 of receiving a license encryption signal S44 from the license server 300b. The license encryption signal S44 comprising a license encryption key associated with the user authentication verification T1. The method 200b further comprises the step 230 of loading an encrypted source code of a software application stored in a memory 106. The method 200b further comprises the step 232 of decrypting the encrypted source code of the software application based on the license encryption key. The method 200b further comprises the step 234 of running the software application by executing the decrypted source code. The encrypted source code can be decrypted with the license encryption key in the form of a cryptography key using a cryptography algorithm. A cryptography key is usually a number or a series of numbers, e.g.: "A1 0C E3 5D F9 34 7B 6D . . . ".

According to an embodiment of the present disclosure, the license encryption key is unique for a software application and an associated software handling device 100. This means that the license encryption key is unique for the software application and the software handling device 100 pair. The license encryption key is created based on the software application and the software handling device, so that a copy of the application package cannot be decrypted on other devices, nor can the key can be used to decrypt other application packages on the same device.

According to a further embodiment of the present disclosure, the license request signal S2 further comprises an indication of an identity of the software application, e.g. an identification number.

According to a further embodiment of the present disclosure, the license request signal S2 further comprises an indication of an identity of a communication device 500 comprising the software handling device 100. The identity of a communication device 500 can be a Medium Access Control (MAC) address or any other suitable hardware identification means.

Figure 4:
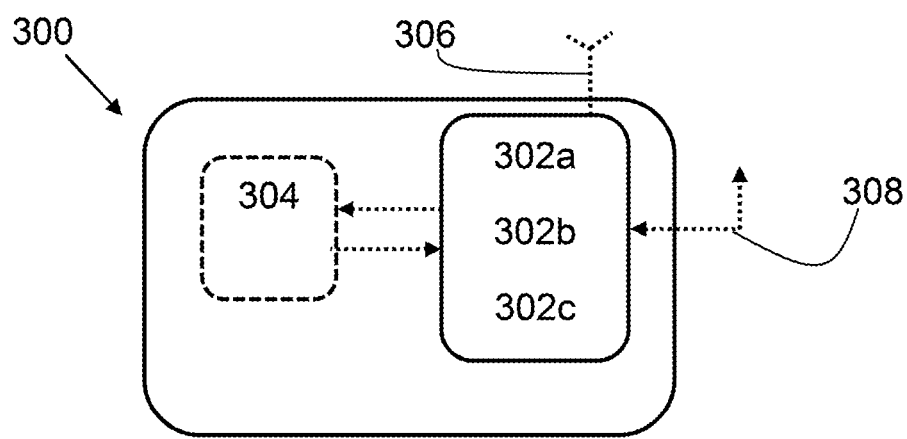
FIG. 4 shows a server system according to embodiments of the present disclosure.

FIG. 4 shows a server system 300 according to embodiments of the present disclosure. The present server system 300 may be a system with independent physical servers for an authentication server 300a, a licensing server 300b and a software application server 300c or a system with virtual servers corresponding to the mentioned servers. The embodiment in FIG. 4 comprises an authentication server 300a, a licensing server 300b and a software application server 300c each comprising independent transceivers 302a, 302b, 302c or sharing a common transceiver in which case the 302a, 302b, 302c are configured in the same transceiver unit. The server system 300 in FIG. 4 also comprises in this particular example a processor 304 communicably coupled to the transceivers 302a, 302b and 302c.

Depending on whether the software handling device 100 is installing or running the software, the transceivers 302a, 302b, 302c of the server system are configured to receive above mentioned signals S1, S2 and S3 from the software handling device 100. Further, the transceivers 302a, 302b, 302c are configured to transmit above mentioned signals S11, S22 and S44 to the software handling device 100.

Figure 5:
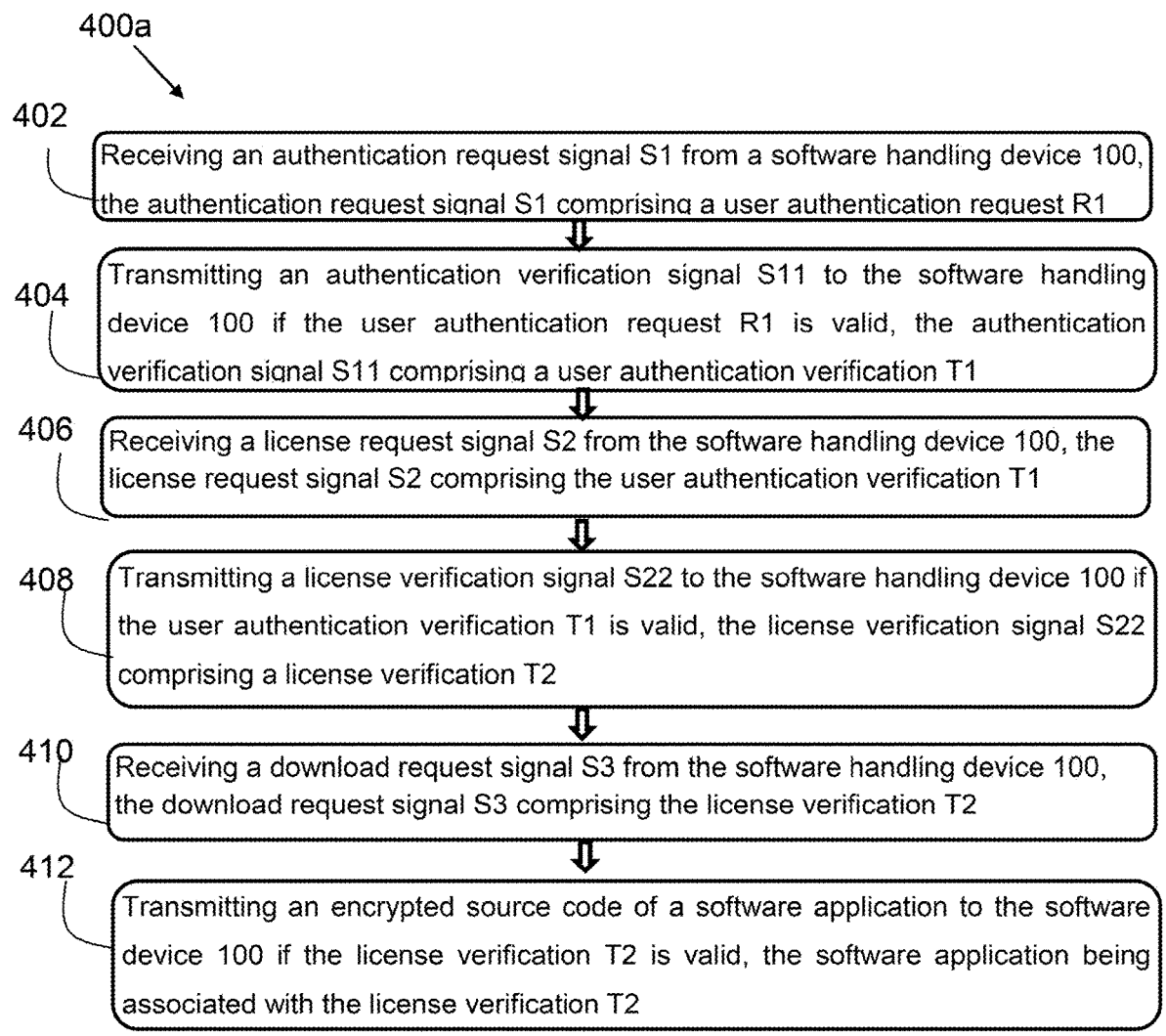
FIG. 5 shows a further method according to an embodiment of the present disclosure.

FIG. 5 shows a corresponding method 400a which in this example is executed in a server system 300 shown in FIG. 4. The method 400a in FIG. 5 relates to the aspect of installing (or downloading) software but as seen from the server system 300 side. The method 400acomprises the step 402 of receiving an authentication request signal S1 from a software handling device 100. The authentication request signal S1 comprising a user authentication request R1. The method 400a further comprises the step 404 of transmitting an authentication verification signal S11 to the software handling device 100 if the user authentication request R1 is valid, e.g. the user name and password in R1 correct. The authentication verification signal S11 comprising a user authentication verification T1. The method 400a further comprises the step 406 of receiving a license request signal S2 from the software handling device 100. The license request signal S2 comprising the user authentication verification T1. The method 400a further comprises the step 408 of transmitting a license verification signal S22 to the software handling device 100 if the user authentication verification T1 is valid. The validity of the user authentication verification T1 can be communicated by a notification from the authentication server 300a to the licensing server 300b. The license verification signal S22 comprises a license verification T2. The method 400a further comprises the step 410 of receiving a download request signal S3 from the software handling device 100, the download request signal S3 comprising the license verification T2. The method 400a further comprises the step 412 of transmitting an encrypted source code of a software application to the software device 100 if the license verification T2 is valid. The software application is associated with the license verification T2. The validity of the license verification T2 can be communicated by a notification from the licensing server 300b to the software application (or resource) server 300c.

Figure 6:
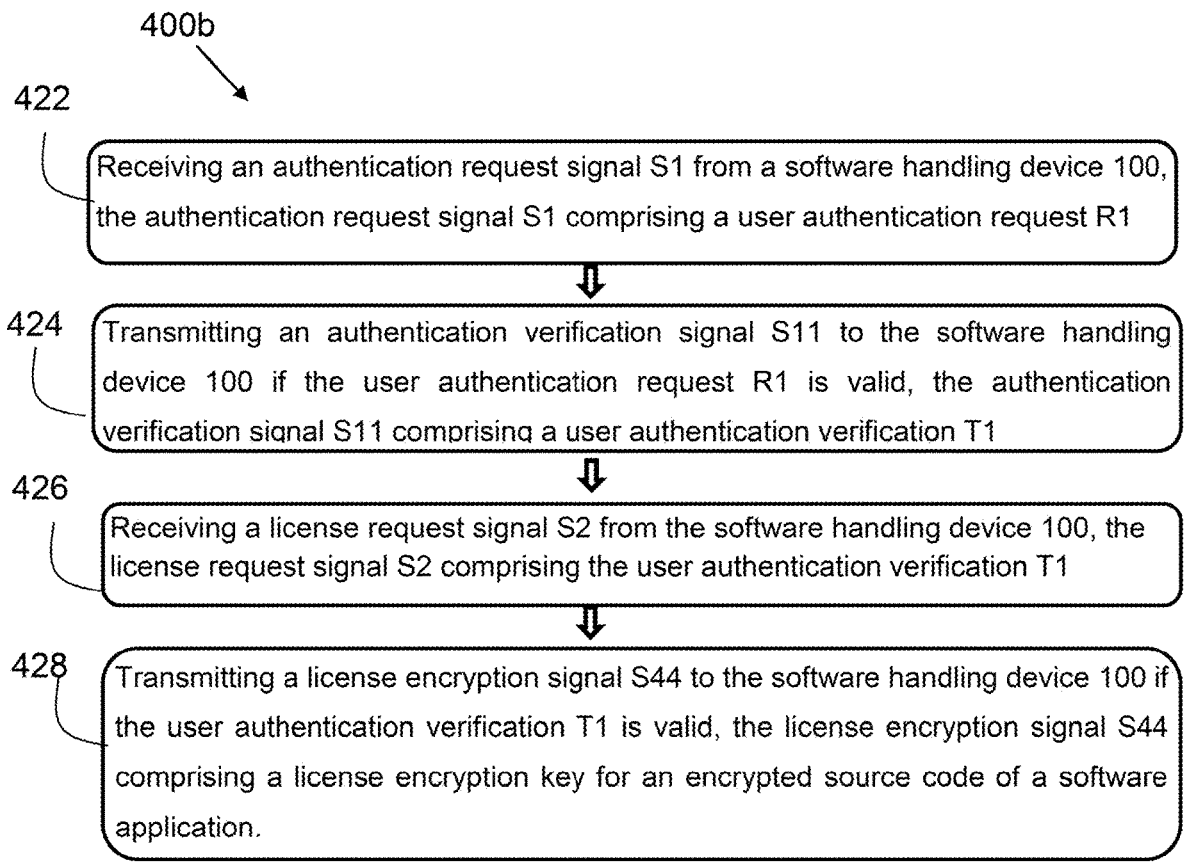
FIG. 6 shows a further method according to an embodiment of the present disclosure.

FIG. 6 shows a corresponding method 400b which in this example is executed in a server system 300 shown in FIG. 4. The method 400b in FIG. 6 relates to the aspect of running or executing the software in the software handling device but as seen from the server system 300 side. The method 400b comprises the step 422 of receiving an authentication request signal S1 from a software handling device 100. The authentication request signal S1 comprising a user authentication request R1. The method 400b further comprises the step 424 of transmitting an authentication verification signal S11 to the software handling device 100 if the user authentication request R1 is valid. The authentication verification signal S11 comprising a user authentication verification T1. The method 400b further comprises the step 426 of receiving a license request signal S2 from the software handling device 100, the license request signal S2 comprising the user authentication verification T1. The method 400b further comprises the step 428 of transmitting a license encryption signal S44 to the software handling device 100 if the user authentication verification T1 is valid. The license encryption signal S44 comprising a license encryption key for an encrypted source code of a software application.

According to an embodiment of the present disclosure, the user authentication verification T1 is a first token and the license verification T2 is a second token. The first and second tokens are valid by the server system during a limited time period and may e.g. be so called magic numbers.

The software handling device 100 and server system 300 may e.g. be implemented as a Web Runtime and a set of Cloud services, respectively, according to an embodiment of the present disclosure. The Web Runtime is a program that hosts HTML applications, maintains encrypted source code, after user authentication and license verification, decrypts a HTML application's source code into the memory 106 and runs the code in the underlying Web Engine. The Web Runtime is often run as software in computing devices which can be found in communication devices 500. After the Web Runtime decrypts the source code (e.g. HTML, JavaScript, and CSS) the Web Runtime starts parsing and executing the source code.

The mentioned Cloud services are services that provide HTML application management, user authentication, license management, HTML source code encryption, and encrypted source code delivery.

Figure 7:
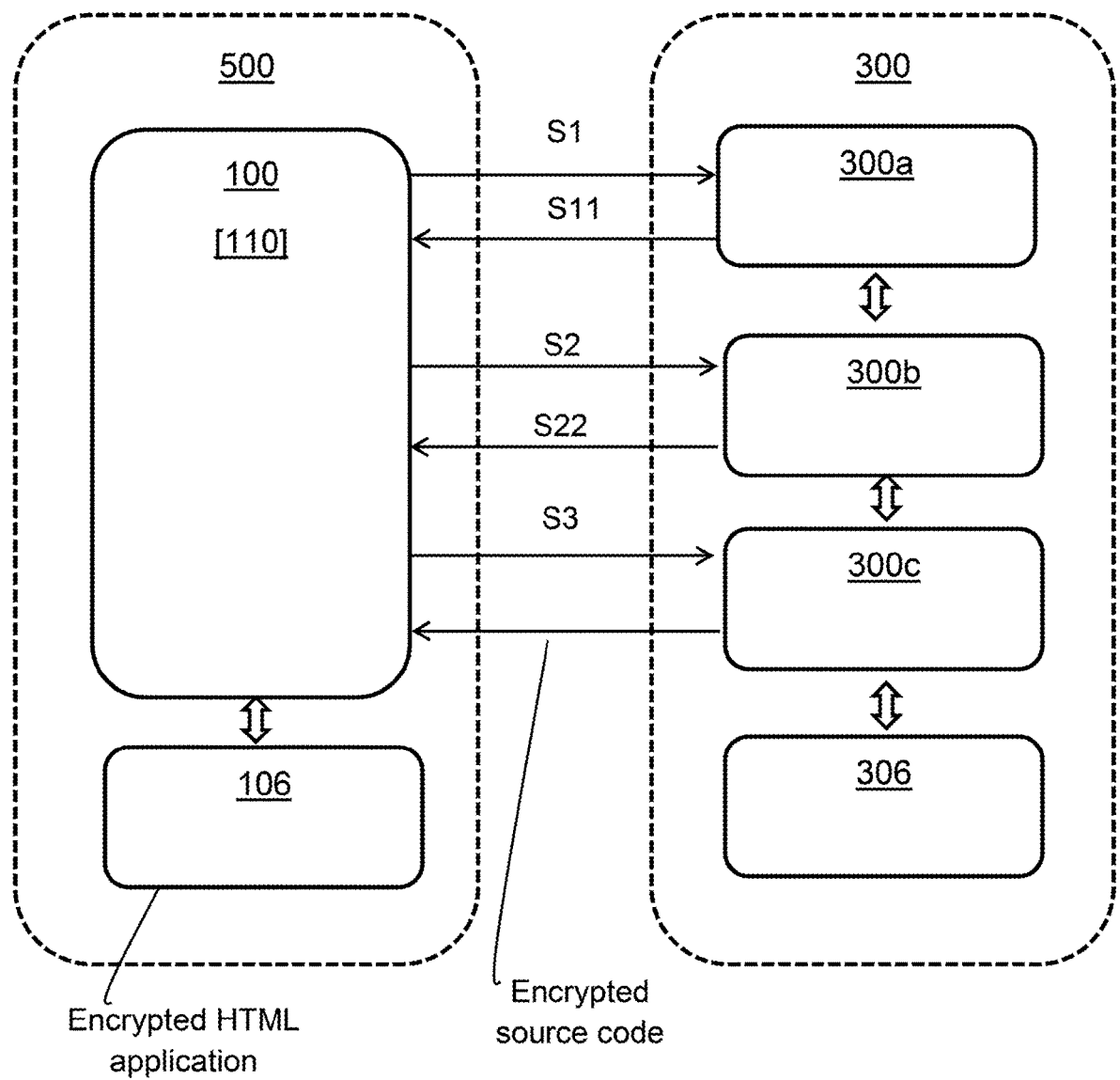
FIG. 7 shows an embodiment of the present disclosure for installing software.

FIG. 7 shows an example of a communication device 500 comprising a software handling device 100 according to an embodiment of the present disclosure, in which the software application is a HTML application. The communication device 500 e.g. can be a smart phone, a tablet, a computer or any other communication device that can install and run software applications and therefore has the suitable communication, computing and processing capabilities. The communication device 500 may have wireless communication capabilities and/or wired communication capabilities. Suitable communication protocols and interfaces may be used for the transmission and reception of communication signals.

FIG. 7 also shows a server system 300 according to an embodiment of the present disclosure. The different servers 300a, 300b, 300c in the present server system 300 may be a group of software components that e.g. can be accessed through the internet and may be hosted by one or multiple physical or virtual computer server systems and/or server system units. The Web Runtime 110 (shown in square bracket in the software handling device 100) is the software component that runs on the communication device 500 and is used to install and launch HTML applications.

When the Web Runtime 110 installs or launches a HTML application, the Web Runtime 100 will first get authenticated by using its authentication module to make a request to the server 300 by transmitting authentication request signal S1. On the server side, the authentication server 300a will handle the request and return authentication verification signal S11. Once the communication device 500 side gets authenticated, the Web Runtime 110 will use its licensing module to make a licensing request by transmitting license request signal S2 to the license server 300b. Then, the license server 300b on the server side will handle the licensing request. Once the licensing is done there are two options depending on if the application should be installed or launched.

When installing the application, the Web Runtime 110 will make a download request for the encrypted package by transmitting download request signal S3 to the software application server 300c. The software encryption server will be used on the server side to encrypt the source code of the HTML application, and send it to the software handing device 100. The Web Runtime 110 will then save the encrypted package in the memory 106 for future use. The local storage of encrypted applications is shown as encrypted HTML application in the memory 106 in FIG. 7.

When launching the application, the Web Runtime 110 will use the decryption module to decrypt the saved application, and then launch the application.

Figure 8:
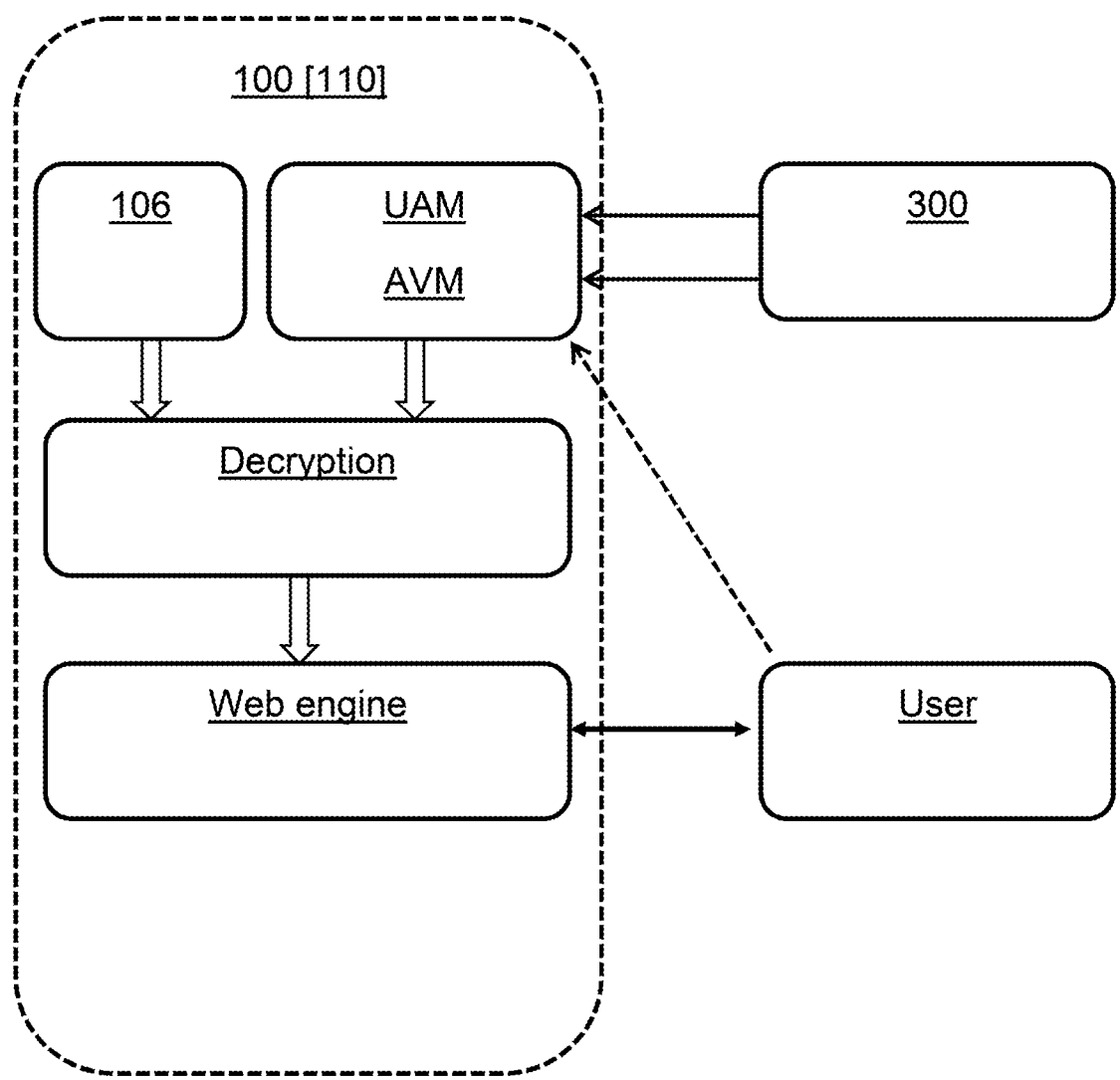
FIG. 8 shows an embodiment of the present disclosure for running software.

FIG. 8 illustrates an example of the flow inside the Web Runtime 110. FIG. 8 shows how the Web Runtime 110 works when it launches a HTML application. When performing authentication, the software handing device usually needs input of the user, i.e. the person using the software handling device 100 or the communication device 500. The Web Runtime 110 uses its user authentication module (UAM) to authenticate the user by signalling with the server system 300 using the application verification module (AVM) and the UAM. These aspects have been explained above. After decrypting the application source code, the Web Runtime 110 loads and runs the source code with its associated Web Engine. When launched the application may e.g. show contents, playing audio/video and handling user inputs, etc.

Figure 9:
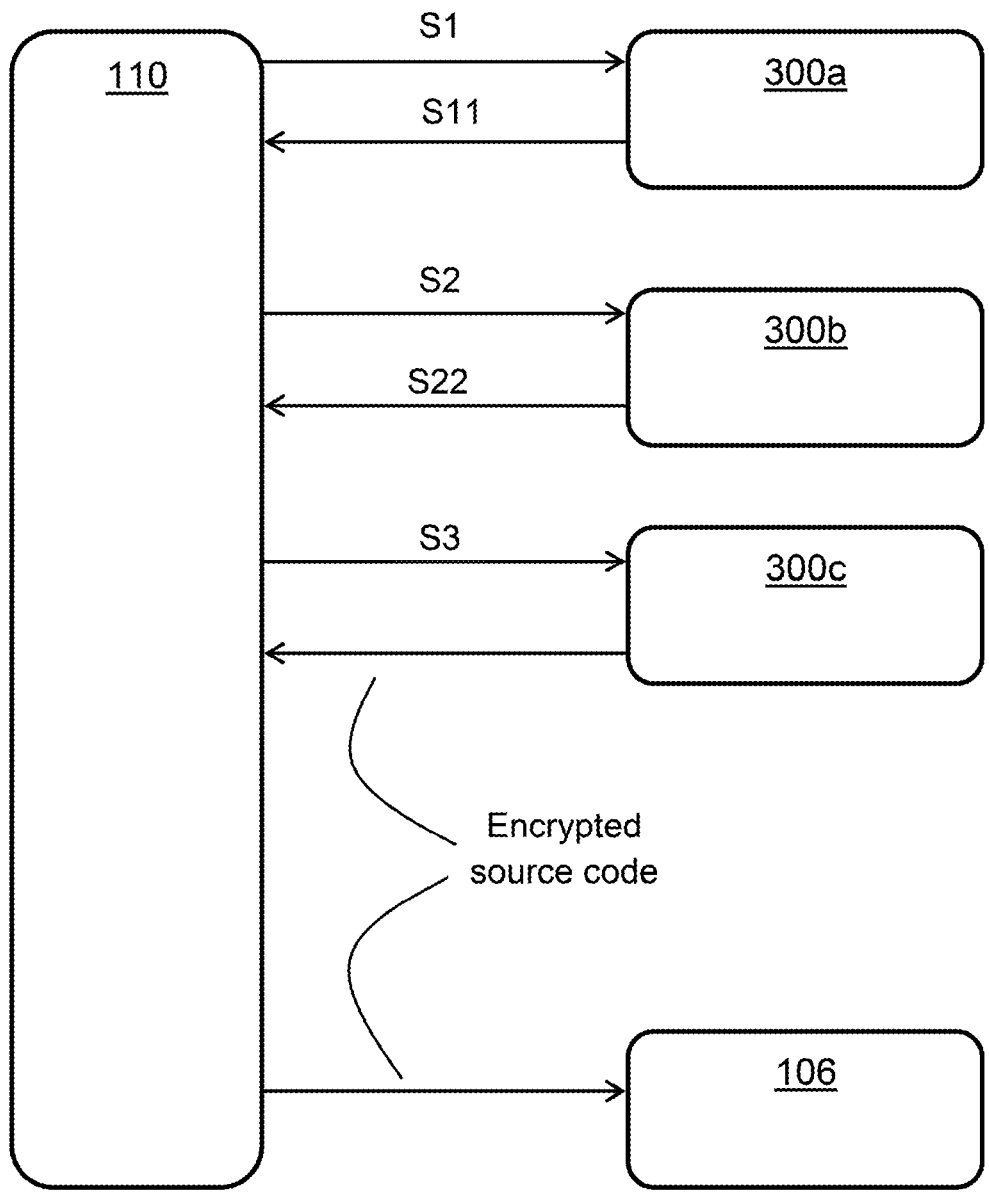
FIG. 9 shows signalling aspects of an embodiment of the present disclosure for installing software.

FIG. 9 shows a more detailed sequence of what happens when the Web Runtime 110 installs an HTML application in the communication device 500. As an example only, the authentication server 300a, licensing 300b server and resource server 300c are in this case full-functional physical servers (i.e. separate computers) rather than the software modules showed in the architecture of the previous Figs. Of course, the servers could be also implemented as software modules running on one and the same computer. The memory 106 is the physical storage means where the encrypted HTML applications is stored.

The Web Runtime will send an authentication request to the authentication server in S1, which returns token A in S11 upon success. Then, the Web Runtime 110 sends token A in S2 to the licensing server. The S2 also comprises a device or hardware token (i.e. a hardware identity that uniquely identifies the software handling device or its associated computing device), and the identity (ID) of the application (e.g. a number that uniquely identifies the application).

After the licensing server 300b verifies that the software handling device 100 or its associated communication device 500 is licensed to use the application on the communication device 500, the licensing server 300b will send back token B in S22. The Web Runtime 110 can then use token B to fetch encrypted source code of the HTML application from the resource server 300c by transmitting S3. The resource server 300c is responsible to perform the encryption with all the required information, such as software application ID, user ID, and communication device ID. It should be noted that relevant server side communications among the authentication server 300a, the licensing server 300b, and the resource server 300c are not shown in FIG. 9.

Figure 10:
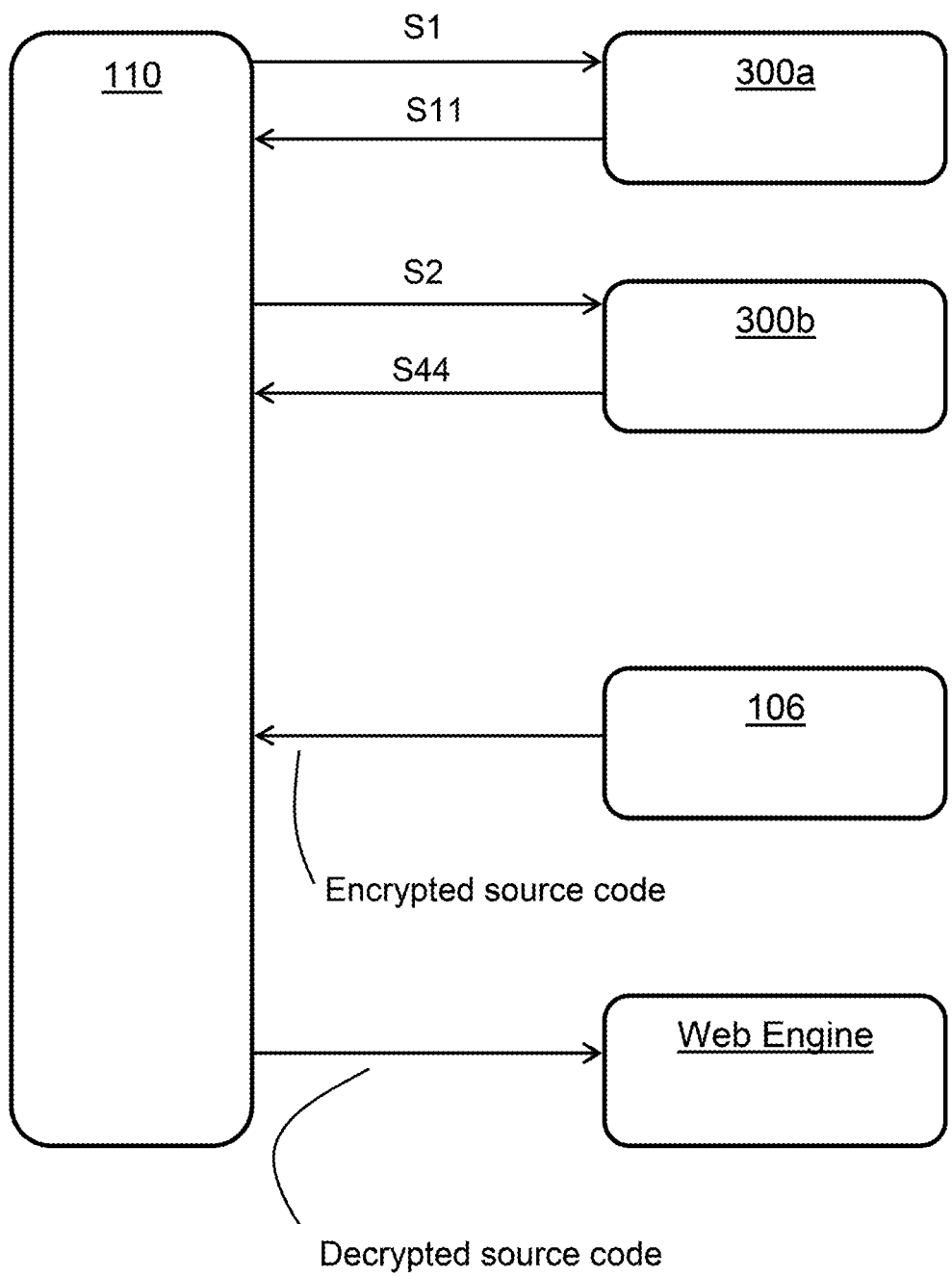
FIG. 10 shows signalling aspects of an embodiment of the present disclosure for running software.

FIG. 10 shows the detailed sequence of what happens when the Web Runtime 110 launches an HTML application. The authentication server 300a and licensing server 300b are also in this example full-functional physical servers (i.e. separate computers). Of course, the servers could also be implemented as software modules running on one and the same computer. Also, in this case the memory 106 is where the encrypted HTML application is stored.

The Web Runtime 110 sends an authentication request in S1 to the authentication server 300a, which returns a token A upon success in S11. Then the Web Runtime 110 sends token A, a device or hardware token (i.e. a hardware identity that uniquely identifies the software handling device or its associated computing device), and an ID of the application (e.g. a number that uniquely identify the application) to the licensing server 300b in S2. After the licensing server 300b verifies that the software handling device 100 or the associated communication device 500 is licensed to use the application, the licensing server 300b will send back an encryption key in S44. The Web Runtime 110 thereafter loads the encrypted source code from the memory 106, and decrypts the source code by using the encryption key along with other information, e.g. device ID, user ID, etc., and then forwards the decrypted source code to the Web Engine which will execute the HTML source code.

Figure 11:
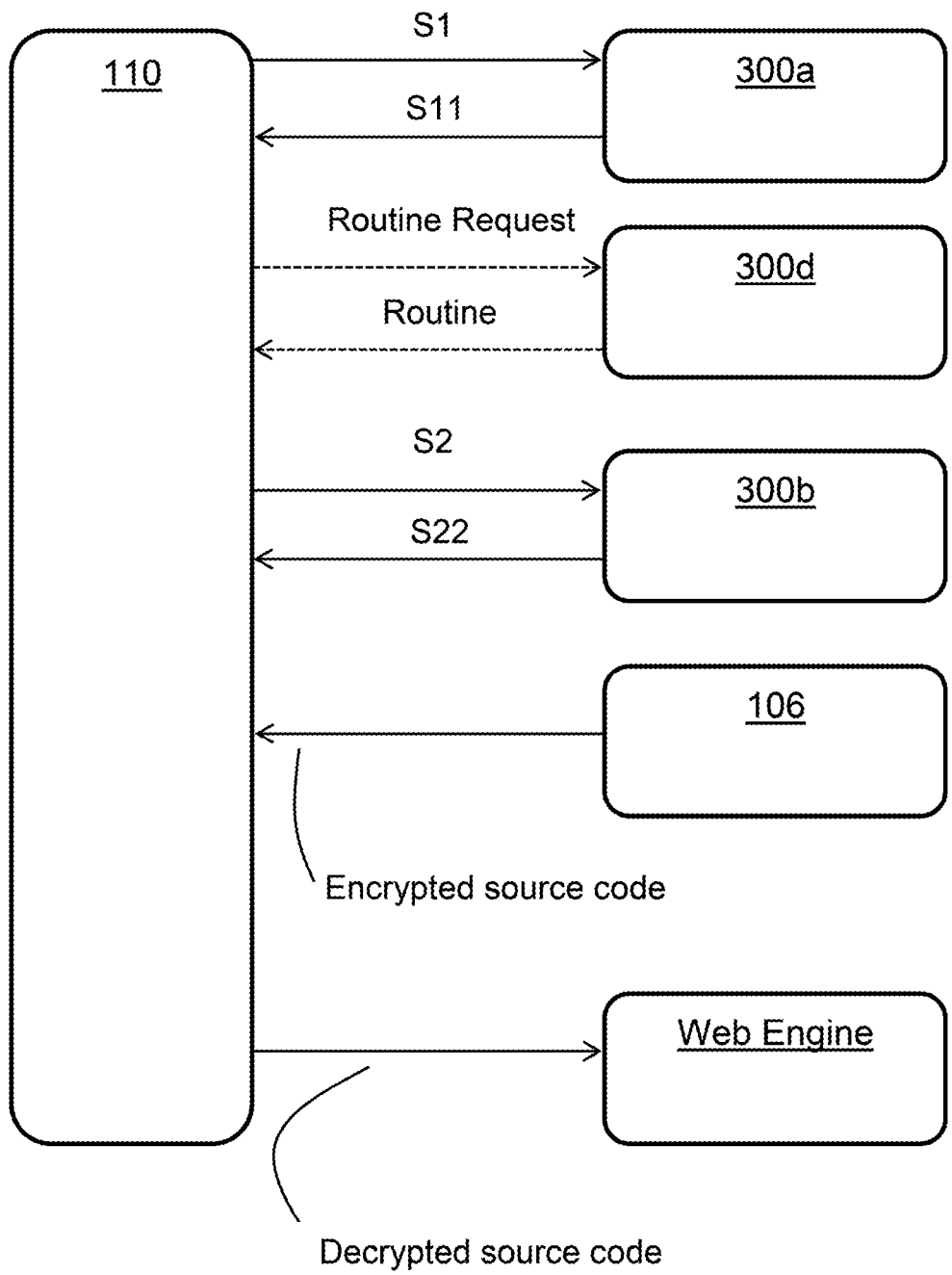
FIG. 11 shows signalling aspects of an embodiment of the present disclosure for running software with the addition of a verification routine.

FIG. 11 shows a further embodiment which is similar to FIG. 10 but adds a Web Runtime verification server 300d to the server system 300 to make the present solution even more secure. Web Runtime 110 sends an authentication request in S1 to the authentication server 300a, which returns a token A upon success in S11. After the Web Runtime 110 gets authenticated (using signals S1 and S11), the Web Runtime 110 is required to use a specific token to download a verification routine from the Web Runtime verification server 300d. The Web Runtime verification server 300d is used to verify that the Web Runtime software on the software handling device 100 has not been tampered. Therefore, a routine request is transmitted to the Web Runtime verification server 300d which returns a verification routine to the Web Runtime 110. The verification routine will then be executed and scan the Web Runtime 110 software, and generate a number, e.g. a token X. The Web Runtime 110 may get different routines every time so that the expected verification token X can also be different every time. If token X that is sent in S2 is the one expected by the licensing server 300b an encryption key will be sent back by the licensing server 300b in S22. Otherwise, the licensing will fail. It is assumed that the license server 300b communicates with the Web Runtime verification server 300d to verify that token X is correct. However, server system side communications are not shown in FIG. 11. The Web Runtime 110 thereafter loads the encrypted source code from the memory 106, and decrypts the source code by using the encryption key along with other information, e.g. device ID, user ID, etc., and then forwards the decrypted source code to the Web Engine which will execute the HTML source code.

Figure 12:
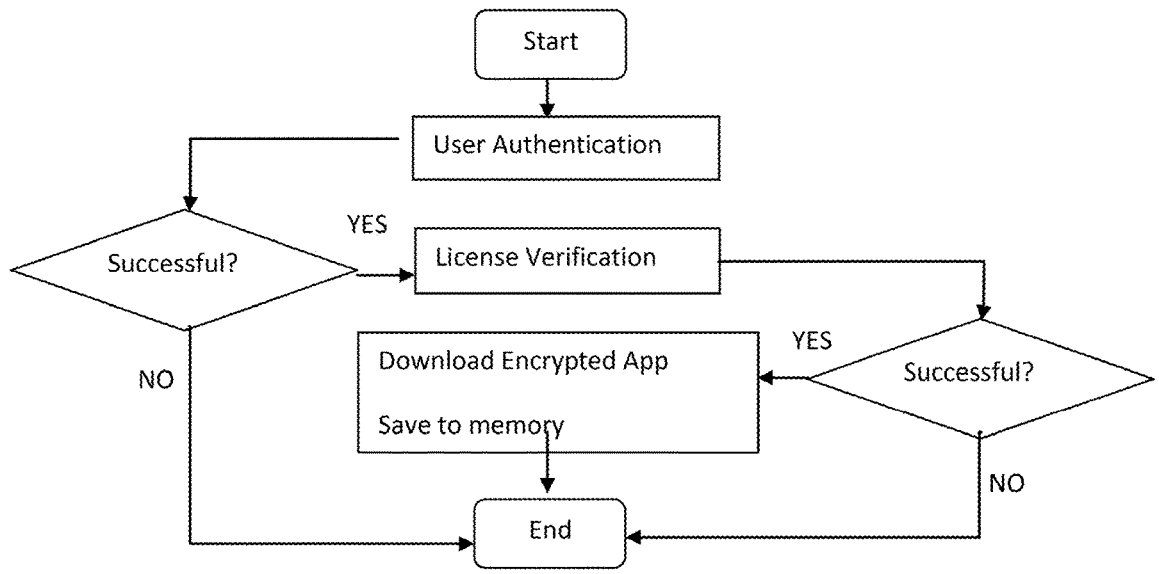
FIG. 12 shows a flow chart for installing software according to an embodiment of the present disclosure.

FIG. 12 shows a flowchart of a process when the Web Runtime 110 installs an application. The Web Runtime 110 first performs user authentication. Upon success, the Web Runtime 110 will continue to license verification which involves communicating with the license server 300b shown in previous Figs. Upon success, the Web Runtime 110 will starts downloading encrypted application to the memory 106. If any of the previous steps fails, the Web Runtime 110 will end the process.

Figure 13:
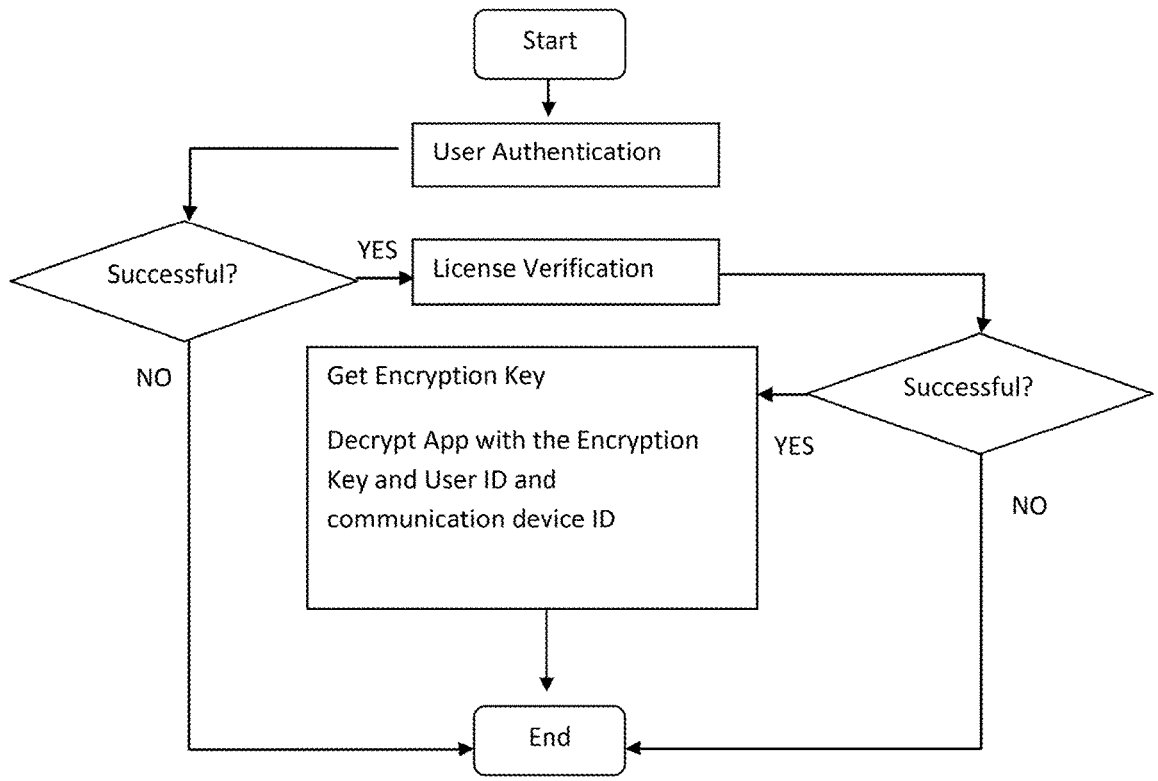
FIG. 13 shows a flow chart for running software according to an embodiment of the present disclosure.

FIG. 13 shows a flowchart of a process when the Web Runtime 110 launches an application. The Web Runtime 110 first performs user authentication task. Upon success, the Web Runtime 110 will continue to license verification which involves communicating with the license server 300b shown in previous Figs. Upon success, Web Runtime 110 will decrypt the source code and launch the same. If any of the previous steps fails, the Web Runtime 110 will end the process.

Furthermore, any method according to the present disclosure may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present software handling device 100 and server system 300 comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present disclosure is not limited to the embodiments described above, but also relates to and incorporates all embodiments within the scope of the appended independent claims.

The invention claimed is:

1. A software handling device, comprising a processor and a non-transitory memory having instructions stored thereon, wherein the instructions, when executed by the processor, cause the following to be performed:
  transmitting, by a Web Runtime program, an authentication request signal to an authentication server, the authentication request signal comprising an authentication request for authenticating the Web Runtime program, wherein the Web Runtime program is configured for hosting HyperText Markup Language (HTML) applications and maintaining encrypted data of an HTML application;
  receiving, by the Web Runtime program, an authentication verification signal from the authentication server, the authentication verification signal comprising an authentication verification in response to the authentication request;
  transmitting, by the Web Runtime program, a license request signal to a licensing server, the license request signal comprising the authentication verification;

receiving, by the Web Runtime program, a license verification signal from the licensing server, the license verification signal comprising a license verification associated with the authentication verification;

transmitting, by the Web Runtime program, a download request signal to a software application server, the download request signal comprising the license verification; and downloading, by the Web Runtime program, the encrypted data of the HTML application from the software application server, the HTML application being associated with the license verification.

2. The software handling device according to claim 1, wherein the software handling device is part of a communication system.

3. The software handling device according to claim 1, wherein the license request signal further comprises an indication of an identity of the HTML application.

4. The software handling device according to claim 1, wherein the authentication verification is a first token or the license verification is a second token.

5. The software handling device according to claim 1, wherein the license request signal further comprises an indication of an identity of a communication device comprising the software handling device.

6. The software handling device according to claim 1, wherein the instructions, when executed by the processor, further cause the following to be performed:

after the Web Runtime program is authenticated, sending, by the Web Runtime program, a routine request to a Web Runtime verification server;

receiving, by the Web Runtime program, a verification routine from the Web Runtime verification server;

executing the verification routine to scan the Web Runtime program to generate a token; and sending, by the Web Runtime program, the token to the licensing server to facilitate the licensing server verifying that the Web Runtime program has not been tampered with.

7. A software handling device, comprising a processor and a non-transitory memory having instructions stored thereon, wherein the instructions, when executed by the processor, cause the following to be performed:

transmitting, by a Web Runtime program, an authentication request signal to an authentication server, the authentication request signal comprising an authentication request for authenticating the Web Runtime program, wherein the Web Runtime program is configured for hosting HyperText Markup Language (HTML) applications;

receiving, by the Web Runtime program, an authentication verification signal from the authentication server, the authentication verification signal comprising an authentication verification in response to the authentication request;

transmitting, by the Web Runtime program, a license request signal to a licensing server, the license request signal comprising the authentication verification;

receiving, by the Web Runtime program, a license encryption signal from the licensing server, the license encryption signal comprising a license encryption key associated with the authentication verification;

loading, by the Web Runtime program, encrypted data of an HTML application;

decrypting, by the Web Runtime program, the encrypted data of the HTML application based on the license encryption key; and running, by the Web Runtime program, the HTML application by executing the decrypted data of the HTML application using a Web Engine.

8. The software handling device according to claim 7, wherein the instructions, when executed by the processor, further cause the following to be performed:

after the Web Runtime program is authenticated, sending, by the Web Runtime program, a routine request to a Web Runtime verification server;

receiving, by the Web Runtime program, a verification routine from the Web Runtime verification server;

executing the verification routine to scan the Web Runtime program to generate a token; and sending, by the Web Runtime program, the token to the licensing server to facilitate the licensing server verifying that the Web Runtime program has not been tampered with.

9. A server system for a communication system, the server system comprising:

an authentication server;
a Web Runtime verification server;
a licensing server; and
a software application server;
wherein the authentication server is configured to:
receive an authentication request signal from a Web Runtime program executed on a software handling device, the authentication request signal comprising an authentication request for authenticating the Web Runtime program, wherein the Web Runtime program is configured for hosting HyperText Markup Language (HTML) applications and maintaining encrypted data of an HTML application; and transmit an authentication verification signal to the Web Runtime program based on the authentication request being valid, the authentication verification signal comprising an authentication verification;

wherein the Web Runtime verification server is configured to:
receive a routine request from the Web Runtime program; and
send a verification routine to the Web Runtime program for verifying that the Web Runtime program has not been tampered with;

wherein the licensing server is configured to:
receive a token from the Web Runtime program, wherein the token is generated based on an execution of the verification routine;
communicate with the Web Runtime verification server to verify whether the token is correct;
receive a license request signal from the software handling device, the license request signal comprising the authentication verification; and
transmit a license verification signal to the software handling device based on the authentication verification being valid and the token being correct, the license verification signal comprising a license verification; and wherein the software application server is configured to:
receive a download request signal from the Web Runtime program, the download request signal comprising the license verification; and
transmit the encrypted data of the HTML application to the Web Runtime program based on the license verification being valid, the HTML application being associated with the license verification.

10. A server system for a communication system, the server system comprising:

an authentication server;
a Web Runtime verification server; and
a licensing server;
wherein the authentication server is configured to:
receive an authentication request signal from a Web Runtime program executed on a software handling device, the authentication request signal comprising an authentication request for authenticating the Web Runtime program, wherein the Web Runtime program is configured for hosting HyperText Markup Language (HTML) applications and maintaining encrypted data of an HTML application; and
transmit an authentication verification signal to the Web Runtime program based on the authentication request being valid, the authentication verification signal comprising an authentication verification;
wherein the Web Runtime verification server is configured to:
receive a routine request from the Web Runtime program; and
send a verification routine to the Web Runtime program for verifying that the Web Runtime program has not been tampered with;
wherein the licensing server is configured to:
receive a token from the Web Runtime program, wherein the token is generated based on an execution of the verification routine;
communicate with the Web Runtime verification server to verify whether the token is correct;
receive a license request signal from the Web Runtime program, the license request signal comprising the authentication verification; and
transmit a license encryption signal to the Web Runtime program based on the authentication verification being valid and the token being correct, the license encryption signal comprising a license encryption key for the encrypted data of the HTML application.

11. The server system according to claim 10, wherein the license encryption key is unique for the HTML application and the software handling device pair.

12. A method for handling software, comprising:
transmitting, by a Web Runtime program executed on a software handling device, an authentication request signal to an authentication server, the authentication request signal comprising an authentication request for authenticating the Web Runtime program, wherein the Web Runtime program is configured for hosting HyperText Markup Language (HTML) applications and maintaining encrypted data of an HTML application;
receiving, by the Web Runtime program, an authentication verification signal from the authentication server, the authentication verification signal comprising an authentication verification in response to the authentication request;
transmitting, by the Web Runtime program, a license request signal to a licensing server, the license request signal comprising the authentication verification;
receiving, by the Web Runtime program, a license verification signal from the licensing server, the license verification signal comprising a license verification associated with the authentication verification;
transmitting, by the Web Runtime program, a download request signal to a software application server, the download request signal comprising the license verification; and
downloading, by the Web Runtime program, the encrypted data of the HTML application from the software application server, the HTML application being associated with the license verification.

13. A method for handling software, comprising:
transmitting, by a Web Runtime program executed on a software handling device, an authentication request signal to an authentication server, the authentication request signal comprising an authentication request for authenticating the Web Runtime program, wherein the Web Runtime program is configured for hosting HyperText Markup Language (HTML) applications;
receiving, by the Web Runtime program, an authentication verification signal from the authentication server, the authentication verification signal comprising an authentication verification in response to the authentication request;
transmitting, by the Web Runtime program, a license request signal to a licensing server, the license request signal comprising the authentication verification;
receiving, by the Web Runtime program, a license encryption signal from the licensing server, the license encryption signal comprising a license encryption key associated with the authentication verification;
loading, by the Web Runtime program, encrypted data of an HTML application;
decrypting, by the Web Runtime program, the encrypted data of the HTML application based on the license encryption key; and
running, by the Web Runtime program, the HTML application by executing the decrypted data of the HTML application using a Web Engine.

14. A method for providing software to a software handling device, the method comprising:
receiving, by an authentication server of a server system, an authentication request signal from a Web Runtime program executed on the software handling device, the authentication request signal comprising an authentication request for authenticating the Web Runtime program, wherein the Web Runtime program is configured for hosting HyperText Markup Language (HTML) applications and maintaining encrypted data of an HTML application;
transmitting, by the authentication server, an authentication verification signal to the Web Runtime program based on the authentication request being valid, the authentication verification signal comprising an authentication verification;
receiving, by a Web Runtime verification server of the server system, a routine request from the Web Runtime program;
sending, by the Web Runtime verification server, a verification routine to the Web Runtime program for verifying that the Web Runtime program has not been tampered with;
receiving, by a licensing server of the server system, a token from the Web Runtime program, wherein the token is generated based on an execution of the verification routine;
communicating, by the licensing server, with the Web Runtime verification server to verify whether the token is correct;
receiving, by the licensing server, a license request signal from the software handling device, the license request signal comprising the authentication verification;
transmitting, by the licensing server, a license verification signal to the software handling device based on the authentication verification being valid and the token being correct, the license verification signal comprising a license verification;

receiving, by a software application server of the server system, a download request signal from the Web Runtime program, the download request signal comprising the license verification; and transmitting, by the software application server, the encrypted data of the HTML application to the Web Runtime program based on the license verification being valid, the HTML application being associated with the license verification.

15. A method for providing a license encryption key to a software handling device, the method comprising:

receiving, by an authentication server of a server system, an authentication request signal from a Web Runtime program executed on the software handling device, the authentication request signal comprising an authentication request for authenticating the Web Runtime program, wherein the Web Runtime program is configured for hosting HyperText Markup Language (HTML) applications and maintaining encrypted data of an HTML application;

transmitting, by the authentication server, an authentication verification signal to the Web Runtime program based on the authentication request being valid, the authentication verification signal comprising an authentication verification;

receiving, by a Web Runtime verification server of the server system, a routine request from the Web Runtime program;

sending, by the Web Runtime verification server, a verification routine to the Web Runtime program for verifying that the Web Runtime program has not been tampered with;

receiving, by a licensing server of the server system, a token from the Web Runtime program, wherein the token is generated based on an execution of the verification routine;

communicating, by the licensing server, with the Web Runtime verification server to verify whether the token is correct;

receiving, by the licensing server, a license request signal from the Web Runtime program, the license request signal comprising the authentication verification; and transmitting, by the software application server, a license encryption signal to the Web Runtime program based on the authentication verification being valid and the token being correct, the license encryption signal comprising the license encryption key, wherein the license encryption key is for the encrypted data of the HTML application.

* * * * *